United States Patent
Boesch et al.

(10) Patent No.: US 10,868,979 B1
(45) Date of Patent: Dec. 15, 2020

(54) BOLOMETER PIXEL READOUT INTEGRATED CIRCUIT INCLUDING TRIGGER SENSE CIRCUIT

(71) Applicant: RAYTHEON COMPANY, Waltham, MA (US)

(72) Inventors: Ryan Boesch, Louisville, CO (US); Matthew C. Thomas, Carpinteria, CA (US); Jeffrey Mitchell, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/438,858

(22) Filed: Jun. 12, 2019

(51) Int. Cl.
| | |
|---|---|
| *G01J 5/20* | (2006.01) |
| *H04N 5/33* | (2006.01) |
| *H04N 5/378* | (2011.01) |
| *G01J 5/22* | (2006.01) |
| *G01J 5/00* | (2006.01) |

(52) U.S. Cl.
CPC ............ *H04N 5/33* (2013.01); *G01J 5/22* (2013.01); *H04N 5/378* (2013.01); *G01J 2005/0077* (2013.01)

(58) Field of Classification Search
None
See application file for complete search history.

(56) References Cited

U.S. PATENT DOCUMENTS

| 6,437,331 B1 * | 8/2002 | Kawano | ............... G01J 5/20 250/332 |
|---|---|---|---|
| 8,431,901 B2 | 4/2013 | Crastes | |
| 10,175,113 B2 | 1/2019 | Masini et al. | |
| 2009/0152465 A1 | 6/2009 | Dupont et al. | |
| 2011/0233404 A1 | 9/2011 | Sonstroem | |
| 2011/0266445 A1 | 11/2011 | Beratan | |
| 2015/0319379 A1 | 11/2015 | Nussmeier et al. | |
| 2019/0373192 A1 * | 12/2019 | Cannata | ............... H04N 5/3658 |

OTHER PUBLICATIONS

Fukaya "Analysis of 320X240 Uncooled Microbolometer Focal Plane Array and Design of Thermoelectric Cooler Controller", New Jersey Institute of Technology, May 1997, p. 1-55. (Year: 1997).*
Partial International Search Issued in International Application No. PCT/US2020/037134; Application Filing Date Jun. 11, 2020; dated Oct. 8, 2020 (15 pages).

* cited by examiner

*Primary Examiner* — David P Porta
*Assistant Examiner* — Mamadou Faye
(74) *Attorney, Agent, or Firm* — Cantor Colburn LLP

(57) ABSTRACT

A thermal imaging system includes a pixel array having a plurality of pixel groups. Each pixel group including a plurality of pixel rows and a trigger sense circuit including a pixel group input line in signal communication with the plurality of bolometer pixels pixel row containing a plurality of bolometer pixels. The pixel group further includes a selector switch that selectively establishes an electrical connection between the pixel group and the trigger sense circuit. The selector switch operates in a first state to disconnect the pixel group from the pixel group input line while connecting the pixel group to the integration unit such that the integration unit generates the image, and a second state to disconnect the pixel group from the integration unit while connecting the pixel group to the pixel group input line such that the trigger sense circuit monitors the pixel group for a high temperature bolometer.

17 Claims, 7 Drawing Sheets

BOLOMETER PIXEL READOUT INTEGRATED CIRCUIT INCLUDING TRIGGER SENSE CIRCUIT

BACKGROUND

The present teachings are generally related to thermal imaging systems, and more particularly, to a readout integrated circuit included in a thermal imaging system.

Bolometer pixels are used in a wide variety of infrared or thermal imaging applications. When they are exposed to heat sources, bolometer pixels change their resistance to provide an output signal. A readout integrated circuit (ROIC) is typically utilized to detect and measure the output signal from one or more of the bolometer pixels. However, bolometer pixels are vulnerable to excessive heat sources which can fundamentally change the mechanical properties and response of the pixels and degrade their resulting imaging capability. In addition, extreme heat sources can completely destroy the pixels.

SUMMARY

Non-limiting embodiments of the present invention are directed to a thermal imaging system comprising a pixel array including a plurality of pixel groups, each pixel group comprising: a plurality of pixel rows containing a plurality of bolometer pixels. The pixel array further comprises a trigger sense circuit including a pixel group input line in signal communication with the plurality of bolometer pixels; and a selector switch that selectively establishes an electrical connection between the pixel group and the trigger sense circuit. An integration unit is configured to generate an image based on a resistance of the plurality of bolometer pixels, wherein the selector switch operates in a first state to disconnect the pixel group from the pixel group input line while connecting the pixel group to the integration unit such that the integration unit generates the image, and wherein the selector switch operates in a second state to disconnect the pixel group from the integration unit while connecting the pixel group to the pixel group input line such that the trigger sense circuit monitors the pixel group for a high temperature bolometer.

Non-limiting embodiments of the present invention are directed to a trigger sense circuit comprising a current source configured to generate a trim current; and a pixel group input line in signal communication with a pixel group included in a pixel array. The pixel group includes a plurality of pixel rows, with each pixel row containing a plurality of bolometer pixels. The trigger sense circuit further comprises an overheating condition detector circuit in signal communication with the pixel group input line; and a selector switch. The selector switch operates in a first state to connect the pixel group to the pixel group input line to establish a signal path between the pixel group and the overheating condition detector circuit, and a second state to disconnect the pixel group from the pixel group input line to open the signal path between the pixel group and the overheating condition detector circuit.

Non-limiting embodiments of the invention are directed to a method of detecting thermal energy delivered to a bolometer pixel, the method comprising arranging a plurality of pixel groups in a pixel array, each pixel group comprising a plurality of pixel rows, each pixel row containing a plurality of bolometer pixels; connecting each pixel group to a pixel group input line, and connecting the pixel group input line to a trigger sense circuit. The method further comprises operating a group selector switch in a first state that disconnects a selected pixel group among the plurality of pixel groups from the pixel group input line and connects the selected pixel group to an integration unit while remaining groups are connected to the pixel group input line, and a second state that disconnects the pixel group from the integration unit and connects the selected pixel group to the pixel group input line such that the selected pixel group is in signal communication with the trigger sense circuit. The method further comprises generating an image based on a resistance of the plurality of bolometers connected to the integration unit; and monitoring a temperature of the remaining pixel groups via the trigger sense circuit.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE SEVERAL VIEWS OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
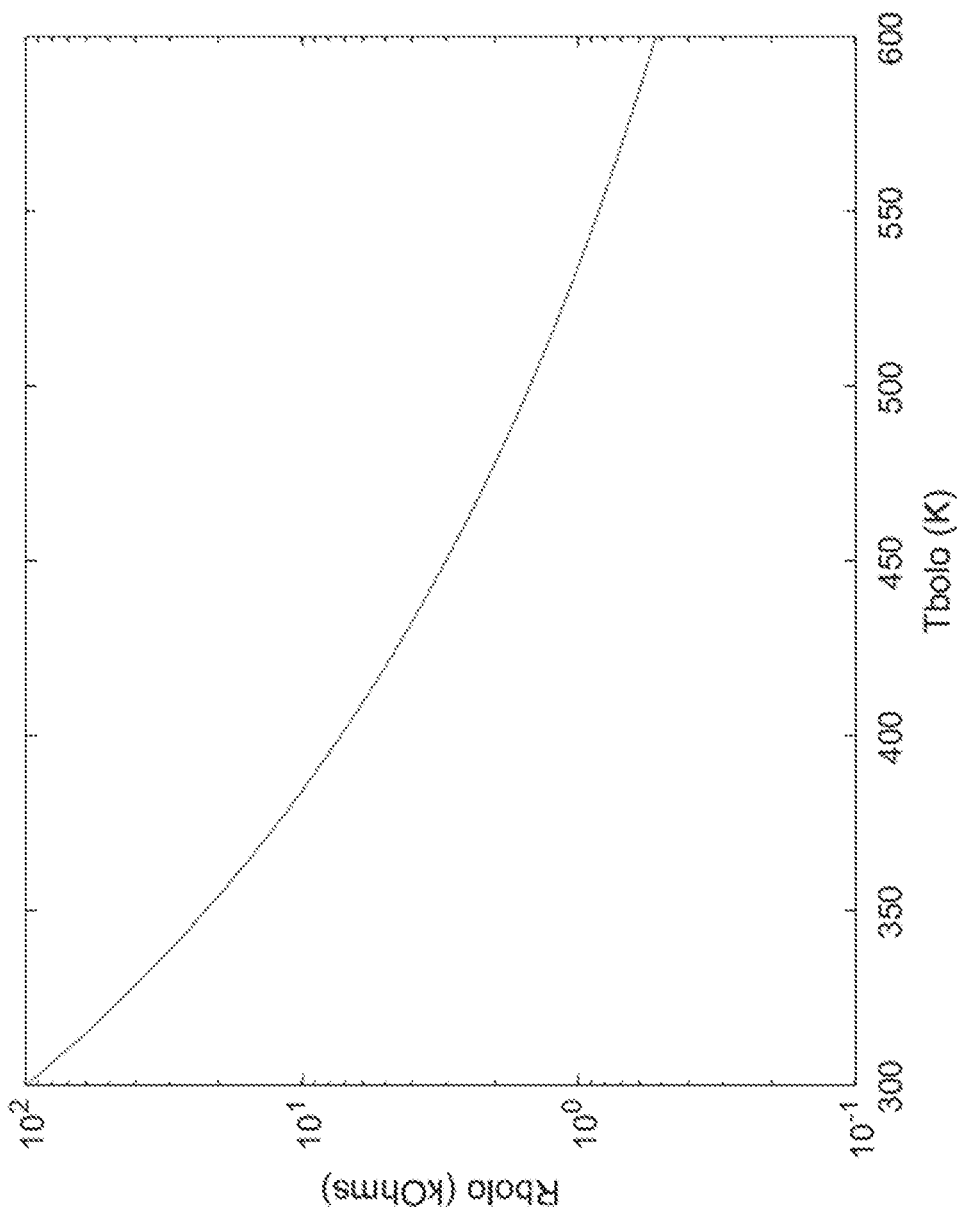
FIG. 1 is an example of a graph illustrating the variation in electrical resistivity of a bolometer pixel with respect to a given temperature.

Various non-limiting embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections or positional relationships, unless otherwise specified, can be direct or indirect, and the present invention is not intended to be limited in this respect. Moreover, the various tasks and process operations described herein can be incorporated into a more comprehensive procedure or process having additional steps or functionality not described in detail herein, or one or more tasks or operations may be optional without departing from the scope of the invention.

The following definitions and abbreviations are to be used for the interpretation of the claims and the specification. As used herein, the terms "comprises," "comprising," "includes," "including," "has," "having," "contains," or "containing," or another variation thereof, are intended to cover a non-exclusive inclusion. For example, a composition, mixture, process, method, article, or apparatus that comprises a list of elements is not necessarily limited to only those elements but can include other elements not expressly listed or inherent to such composition, mixture, process, method, article, or apparatus.

Additionally, the terms "at least one" and "one or more" may be understood to include a number greater than or equal to one (e.g., one, two, three, four, etc.). The term "a plurality" may be understood to include a number greater than or equal to two (e.g., two, three, four, five, etc.). The terms "about," "substantially," or "approximately," or variations thereof, are intended to include a degree of error associated with measurement of the particular quantity based upon the equipment available.

For the sake of brevity, conventional techniques related to making and using aspects of the invention may or may not be described in detail herein. In particular, various aspects of computing systems to implement the various technical features described herein may be well known. Accordingly, in the interest of brevity, some conventional implementation details are only mentioned briefly herein or are omitted entirely without providing the well-known system or process details.

Turning now to an overview of technologies that are more specifically relevant to aspects of the invention, readout integrated circuits (ROICs) are typically implemented in thermal imaging system to measure the resistivity of one or more bolometer pixels. Conventional bolometer ROICs typically perform a measurement on a "biased" group of bolometer pixels for a small portion of a frame period while disregarding the "unbiased" bolometer pixels for the majority of a frame period. As a result, the ROIC may not identify an overheated bolometer pixel until the pixel group containing the over-heated bolometer pixel is biased and read out, which may take a considerable fraction of a frame period, ultimately resulting in irreversible damage to the overheated bolometer pixel.

One or more non-limiting embodiments of the invention address the above-described shortcomings of the prior art by providing a trigger sense circuit to the ROIC that performs a pulsed-bias measurement of a bolometer pixel array. The bolometer pixel array contains a multitude of bolometer pixels arranged in selectable rows. The bolometer pixels are thermally sensitive to a change in temperature. As the temperature of a given bolometer pixel increases, its resistance decreases (see FIG. 1). A subset of the rows included in the pixel array are biased at any given time, while the a majority of remaining unbiased pixel rows remain exposed to thermal energy detection but are electrically floating to reduce power consumption and prevent bolometer temperature increases due to Joule heating.

Unlike conventional bolometer ROICs, the ROIC described herein utilizes the formerly unbiased or unread detectors as resistance reference sources, which in turn can be used as high-energy thermal detectors. Accordingly, an instantaneous value of a parallel combination of a group of resistors (e.g., 2 rows) can be provided. When this value crosses a threshold, a comparator in the trigger sense circuit is tripped and outputs a trigger signal to the controller which determines that one or more bolometer pixels are overheated.

Figure 2:
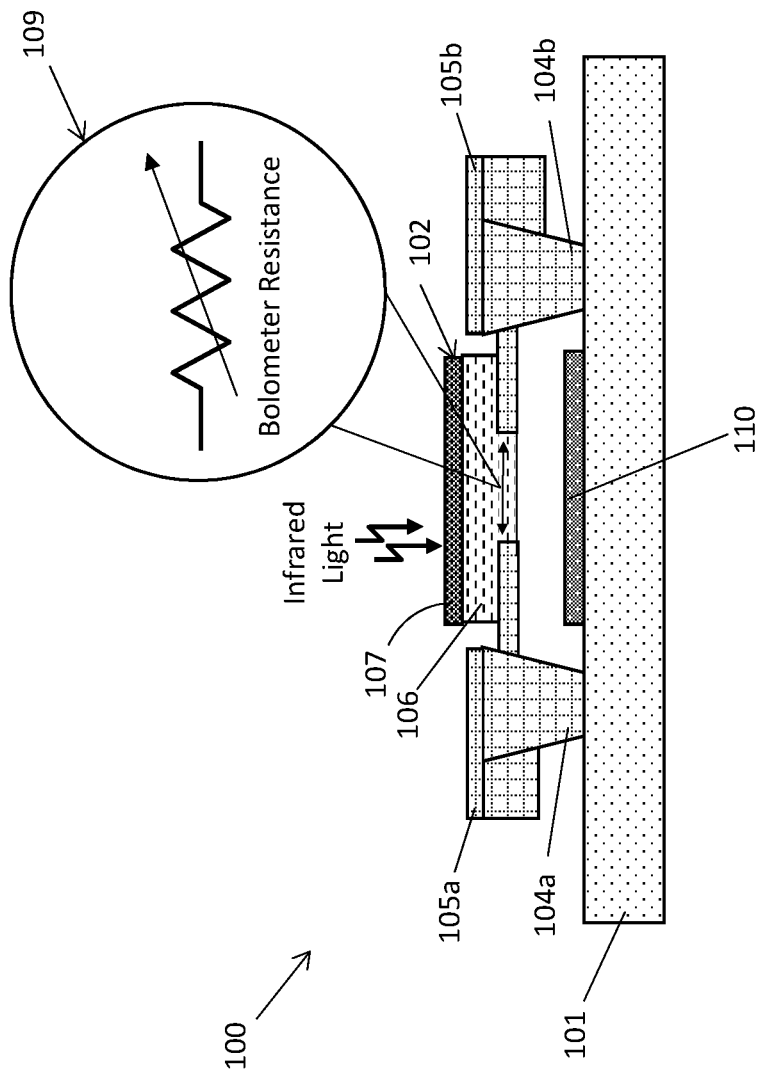
FIG. 2 is a block diagram view of a bolometer pixel according to a non-limiting embodiment.

Turning now to FIG. 2, a bolometer pixel 100 is illustrated according to a non-limiting embodiment. The bolometer pixel 100 includes a substrate 101 that supports a bolometer 102 via a pair of opposing support beams 104a and 104b. The support beams 104a, 104b each include an electrode 105a and 105b. The bolometer 102 includes a photosensitive region 106 (sometimes referred to as a mesa), which is interposed between the electrodes 105a, 105b, and thermally isolated from the substrate 101 by the support beams 104a, 104b.

The photosensitive resistive region 106 is formed from a thermoelectric conversion material (e.g. amorphous silicon) having a thermal resistance coefficient value. In some embodiments, an absorber layer 107 is formed on an upper surface of the photosensitive resistive region 106 and is configured to selectively pass wavelengths of light (e.g., infrared light). The thermal resistance coefficient value provides a bolometer thermal resistance 109, which can be utilized to sense thermal energy delivered to the bolometer pixel 100. For example, when thermal energy (e.g., infrared light) is delivered to the photosensitive resistive region 106, the resistance of the thermoelectric conversion material decreases. When the ROIC 110 applies a current, the change in bolometer electrical resistance is converted into a voltage, which can be read out via a ROIC 110 such that the bolometer 102 can be utilized as a thermal sensor.

Figure 3:
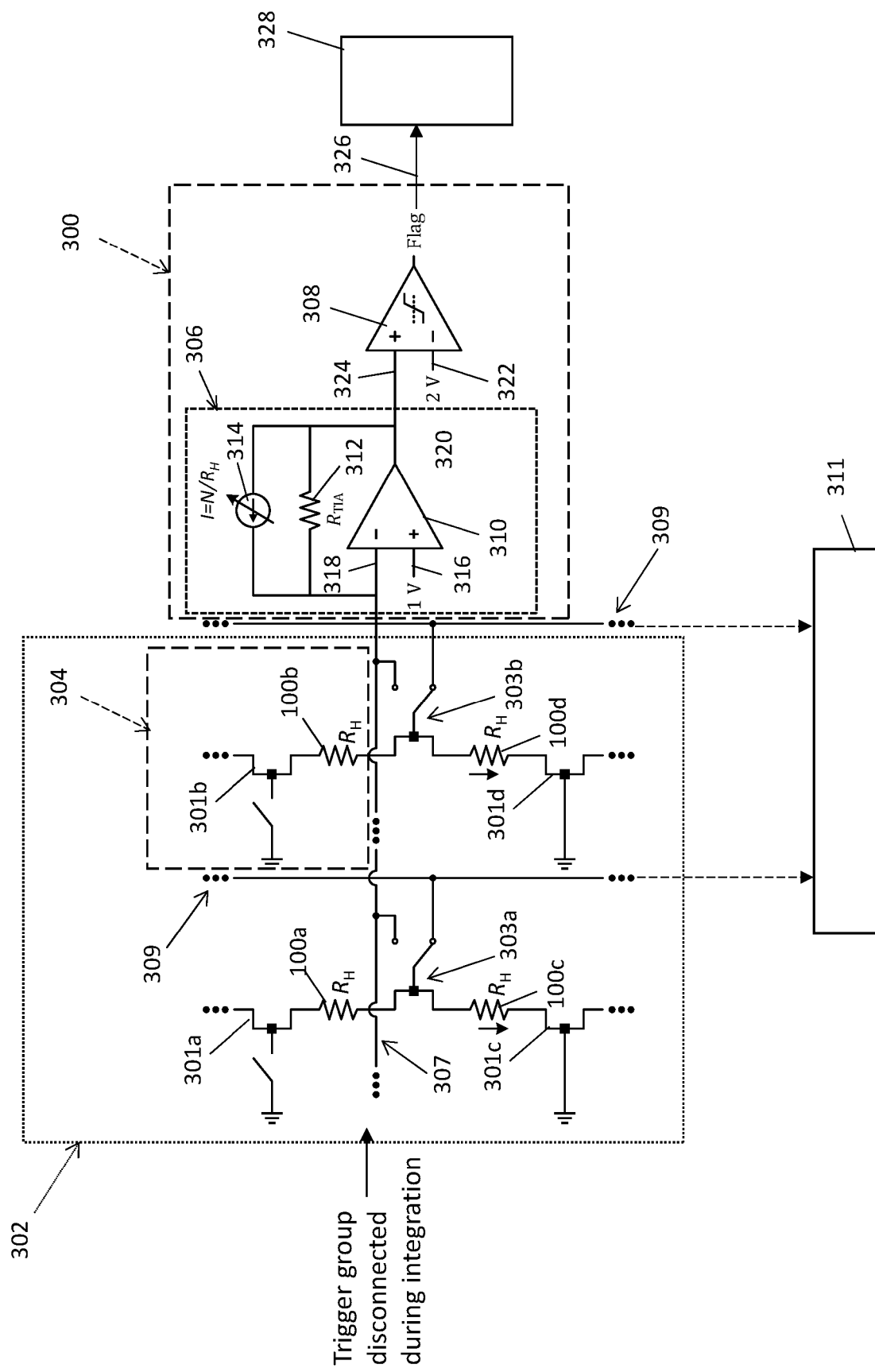
FIG. 3 is a schematic diagram of a trigger sense circuit included with a ROIC according to a non-limiting embodiment.

Turning now to FIG. 3, a trigger sense circuit 300 located on a ROIC is illustrated being in signal communication with a pixel group 302 included in a larger pixel array (not shown). The pixel array therefore includes a plurality of pixel groups, where each pixel group is connected to a respective trigger sense circuit 300. Accordingly, the trigger sense circuit 300 of a given pixel group 302 can detect one or more overheated bolometer pixels in a given pixel group 302.

Each pixel group 302 includes a plurality of pixel cells 304 arranged in selectable rows. A first row, for example, includes a first pixel cell including bolometer pixel 100a and second pixel cell including bolometer pixel 100b, while a second row includes a third pixel cell including bolometer pixel 100c and a fourth pixel cell including bolometer pixel 100d. Each pixel cell 304 further includes a bolometer selector switch 301a, 301b, 301c, 301d, respectively.

Each trigger sense circuit 300 is connected to a pixel group input line 307. The pixel group input line 307 is connected to one or more pixel group selector switches 303a, 303b. Although two group selector switches 303a, 303b are shown, the embodiments described herein are not limited thereto. In this example, a first group selector switch 303a is interposed between bolometer pixel 100a included in the first row and bolometer pixel 100c included in the second row. Similarly, a second group selector switch 303b is interposed between bolometer pixel 100b included in the first row and bolometer pixel 100d included in the second row. The pixel group selector switches 303a, 303b are configured to operate in a first state and a second state to selectively establish electrical connection between the pixel group 302 and either the pixel group input line 307 or an integration signal line 309.

When operating in a first state (see FIG. 3), the pixel group selector switches 303a, 303b disconnect the pixel group 302 from the pixel group input line 307 (and thus the trigger sense circuit 300), while establishing an electrical connection with the integration signal line 309, which is connected to an integration unit 311. When operating in a second state (see FIGS. 4 and 5), the pixel group selector switches 303a, 303b disconnect the pixel group 302 from the integration signal line 309, while establishing electrical connection to the pixel group input line 307 and thus the trigger sense circuit 300.

A thermal imaging system reads an image generated by a pixel array by integrating the measurements of each row in the larger pixel array. For example, to read an image generated by pixel bolometers 100c and 100d included in the second row of the pixel group 302, the thermal imaging system invokes the first state of the pixel group selector switches 303a, 303b so that bolometer pixel 100a, 100b, 100c, 100d are connected to their respective integration signal lines 309. The thermal imaging system then activates bolometer selector switches 301c and 301d to connect pixel bolometers 100c and 100d to a ground reference. Accordingly, the integration unit 311 determines the resistance of pixel bolometers 100c and 100d to read their respective images.

Although not illustrated, the thermal imaging system performs a similar operation to read the image generated by pixel bolometers 100a and 100b included in the first row of the pixel group 302. For example, while the pixel group selector switches 303a, 303b are in the first state, the thermal imaging system deactivates bolometer selector switches 301c and 301d to disconnect pixel bolometers 100c and 100d from the ground reference, and activates bolometer selector switches 301a and 301b to connect pixel bolometers 100a and 100b to a ground reference. Accordingly, the integration unit 311 integrates the current from bolometers 100a and 100b to generate an integrated voltage inversely proportional to the resistance of pixel bolometers 100a and 100b, which can be referred to as read their respective images. After reading the image of each pixel bolometer 100a, 100b, 100c, 100d in the pixel group 302, the thermal imaging system invokes the second state of the pixel group 302 such that the pixel group 302 is disconnected from the integration unit 311 and connected to the trigger sense circuit 300 (see FIGS. 4 and 5). Accordingly, the trigger sense circuit 300 can determine whether one or more of the pixel bolometers 100a, 100b, 100c, 100d are overheated as described in greater detail below. The thermal imaging system continuously repeats the operations described above for each pixel group included in the pixel array. That is, the thermal imaging system sequentially connects and disconnects each pixel group to and from the integration unit over an image integration time period in order to integrate the images generated by each bolometer pixel included in the pixel array. However, the majority of each frame period the pixels are connected to the trigger sense circuit so any overheating can be detected.

Figure 4:
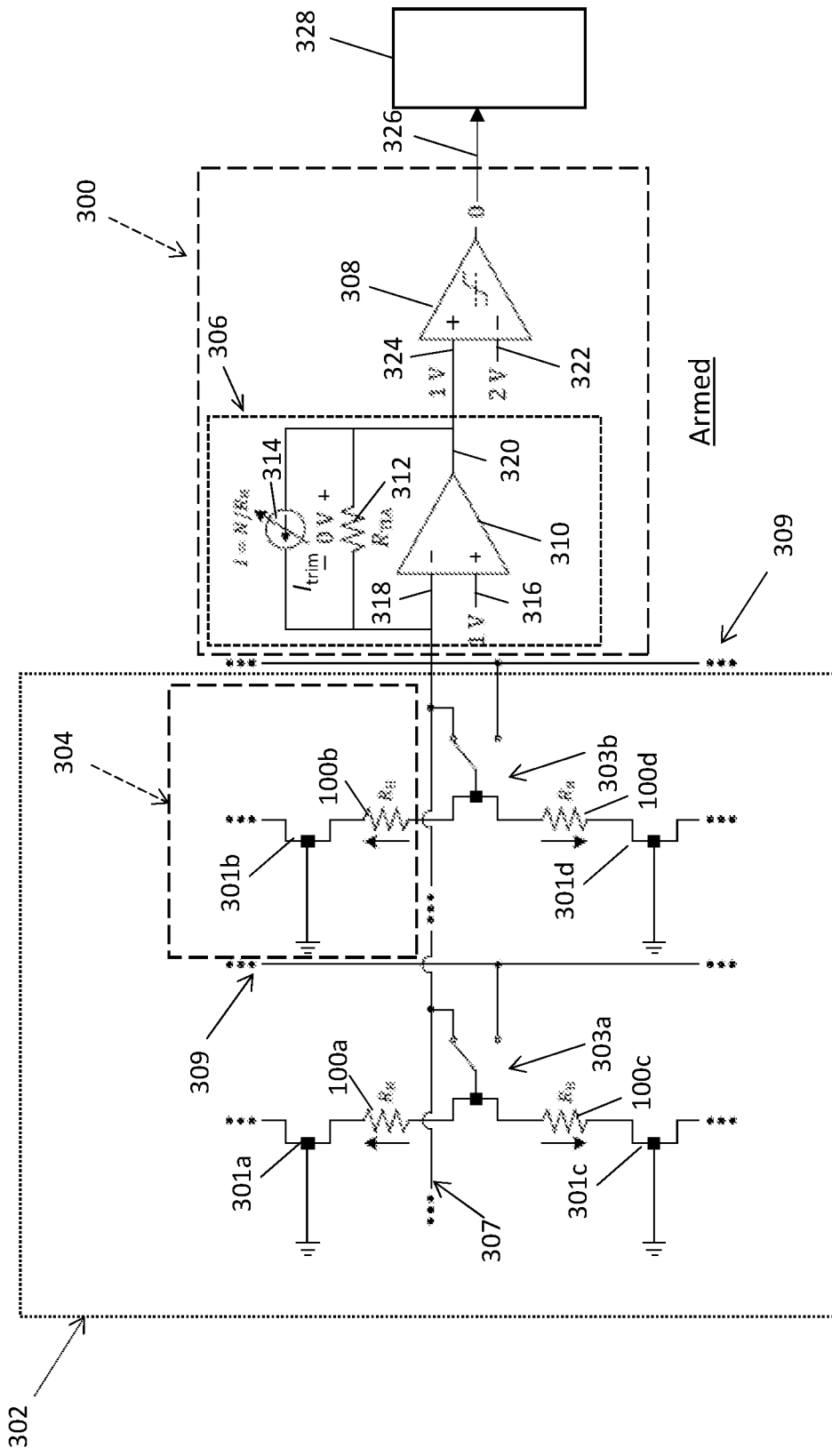
FIG. 4 is a schematic diagram of the trigger sense circuit included with a readout integrated circuit (ROIC) shown in FIG. 3 operating in an armed state according to a non-limiting embodiment.
Figure 5:
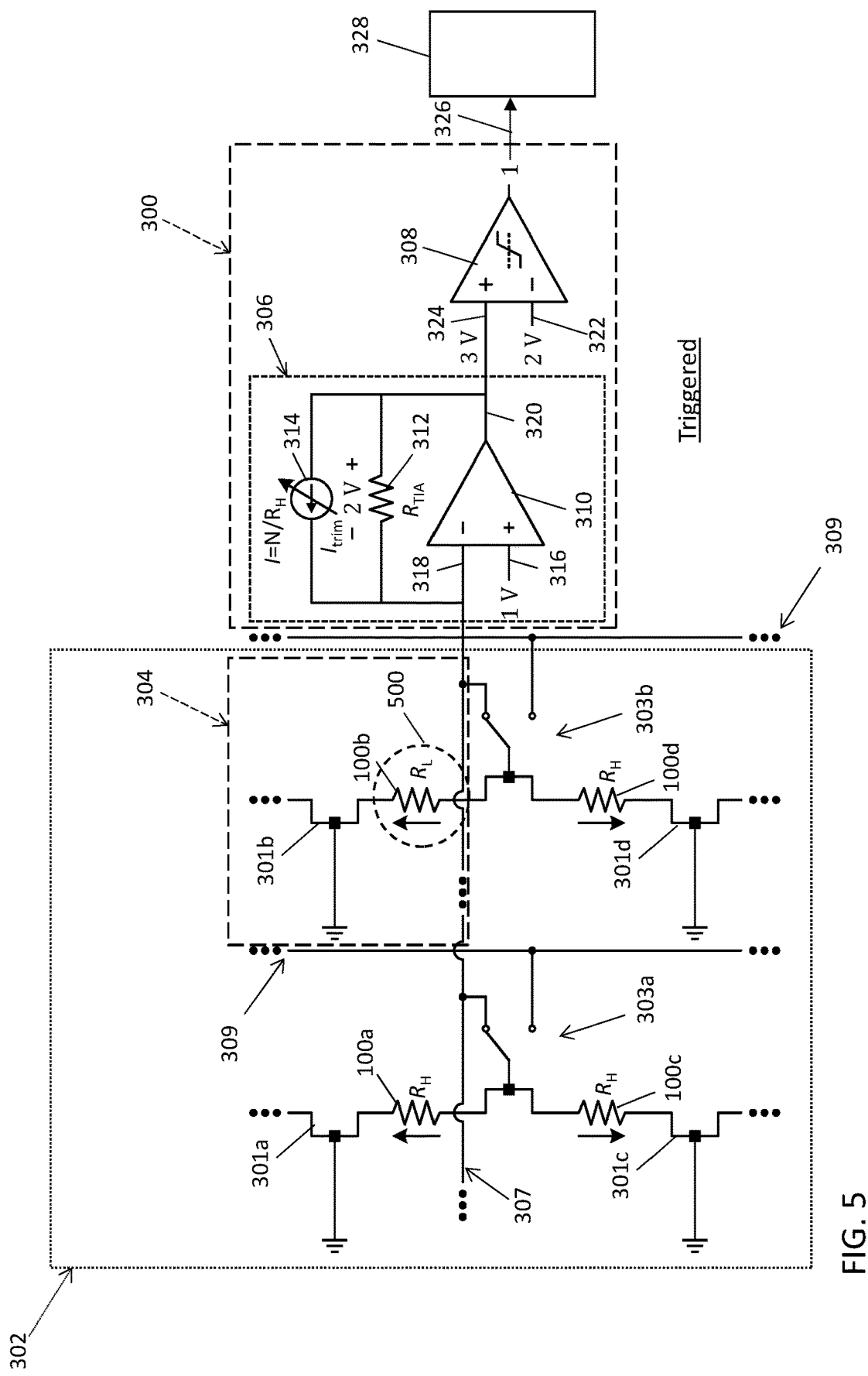
FIG. 5 is a schematic diagram of the trigger sense circuit included shown in FIG. 4 operating in a triggered state according to a non-limiting embodiment.

Still referring to FIGS. 3-5, the trigger sense circuit 300 includes a resistance transimpedance amplifier circuit (RTIA) 306, and an electronic comparator 308. The combination of the pixel group selector switches 303a, 303b, pixel group input line 307, RTIA 306, and electronic comparator 308 provides one example of a trigger sense circuit 300 capable of detecting whether one or more of the bolometer pixels 100a, 100b, 100c, 100d have become overheated due to exposure to an excessive amount of thermal energy (e.g., solar radiation, laser energy, etc.). In FIGS. 3-5, bolometer pixels 100a, 100b, 100c, 100d are operating at an expected normal temperature, e.g., at about 300° C. (i.e., not overheated by thermal energy), and their resistance is referenced as "$R_H$".

The RTIA 306 includes an operational amplifier (OpAmp) 310, a feedback resistor ($R_{TIA}$) 312, and a current source 314. A first input terminal 316 (e.g., positive terminal) of the OpAmp 310 is connected to a bias voltage ($V_{bias}$) (e.g., 1 V), while a second input terminal 318 (e.g., negative terminal) is connected to the pixel group input line 307. A first end of the feedback resistor 312 is connected to the second input terminal 318 (e.g., negative terminal) of the OpAmp 310, while the opposing second end is connected to the output 320 of the OpAmp 310. The input of the current source 314 is connected in common with the second end of the feedback resistor 312 and the output 320 of the OpAmp 310, while the output of the current source 314 is connected in common with the first end of the feedback resistor 312 and the second input terminal 318 of the OpAmp 310.

Turning to FIG. 4, the trigger sense circuit 300 is shown operating in an armed state. The current source 314 generates a direct current (DC)-sourced trim current ($I_{trim}$) to source the "untriggered" bias current to the bolometers. Because none of the bolometer pixels 100a, 100b, 100c, 100d are overheated, they are all operating in an "untriggered" state such that approximately an equal amount of current flows through each pixels 100a, 100b, 100c, 100d. The amount of current ($I_{LRH}$) flowing through a given untriggered pixel 100a, 100b, 100c, 100d can be calculated as: $I_{LRH}=V_{bias}/R_H$.

The difference in total current through the bolometers in a trigger group and the trim current ($I_{trim}$) induces an initial voltage (e.g., 0V) across $R_{TIA}$ 312, which is applied to the second input terminal 318 of the OpAmp 310. Accordingly, the OpAmp output 320 generates a first RTIA output voltage (e.g., 1V). In this manner, the RTIA 306 serves as a current monitor by converting the sum of the currents minus the trim current level ($I_{trim}$) into an output voltage signal.

The comparator 308 includes a first input terminal 322 (e.g., a reference voltage terminal 322) and a second input terminal 324 (e.g., a RTIA voltage terminal 324). The reference voltage terminal 322 is connected to a voltage source to receive a reference voltage (e.g., 2V). The RTIA voltage terminal 324 is connected to the OpAmp output 320 to receive the RTIA output voltage. When the trigger sense circuit 300 is operating in the normal armed state as shown in FIG. 4, the RTIA output voltage (e.g., 1 V) applied to the RTIA voltage terminal 324 is less than the reference voltage (e.g., 2 V) applied to the reference voltage terminal 322. Accordingly, the comparator 308 outputs a trigger signal 326 having a first signal state (e.g., binary "0" bit value).

Turning now to FIG. 5, the trigger sense circuit 300 is shown operating in a triggered state according to a non-limiting embodiment. Bolometer pixel 100b, for example, receives an excessive amount of thermal energy 500 (e.g., incident infrared light, solar energy, etc.) such that its resistance ($R_L$) changes. In this example, the resistance ($R_L$) of bolometer pixel 100b decreases as its temperature increases. Accordingly, current flow through bolometer pixel 100b increases, thereby invoking a "tripped" state. In FIG. 5, an overheated tripped bolometer pixel (e.g., bolometer pixel 100b) is referenced as "$R_L$", indicating that its resistance reduced allowing an increased level of current to flow therethrough.

In response to tripping bolometer pixel 100b, the difference between the sum of the currents and the fixed trim current ($I_{trim}$) 314 increases due to the reduced resistance of the bolometer pixel 100b, thereby invoking a "tripped" state of the trigger sense circuit 300. The amount of current ($I_{LRL}$) flowing through an overheated bolometer pixel can be calculated as: $I_{LRL}=V_{bias}/R_L$. The increased current also changes the voltage (e.g., 2V) across $R_{TIA}$ 312, which is applied to the second input terminal 318 of the OpAmp 310. Accordingly, the OpAmp output 320 generates a second RTIA output voltage (e.g., 3V). In this manner, the RTIA 306 indicates a change in the current level based on the changed output voltage signal (e.g., 3V).

In the triggered state, the second RTIA output voltage (e.g., 3V) applied to the RTIA voltage terminal 324 of the comparator 308 is now greater than the reference voltage (e.g., 2V) applied to the reference voltage terminal 322. Accordingly, the comparator 308 outputs a trigger signal 326 having a second signal state (e.g., a binary "1" bit value). A controller 328 can receive the trigger signal 326 in either case (armed or triggered), and in response to detecting the second signal state (e.g. a binary "1" bit value) can output a protection control signal that invokes a protection operation to protect the overheated bolometer pixel 100b. The protection operation can include, but is not limited to, initiating a fast-acting mechanical shutter or a variable transmission window mounted in front of the bolometer array to block the excessive energy delivered to the over-heated pixel(s).

Figure 6:
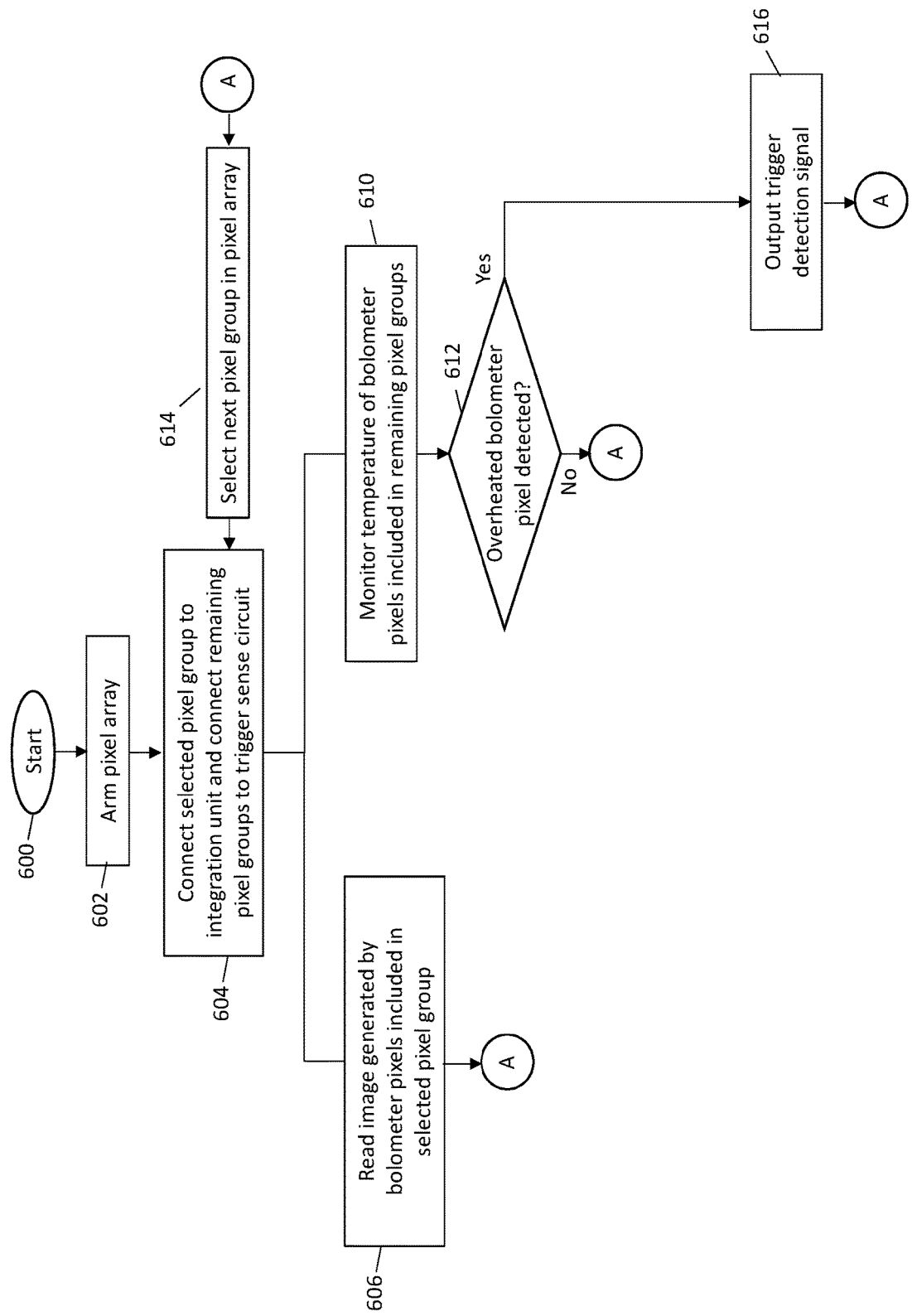
FIG. 6 is a flow diagram illustrating a method of detecting thermal energy delivered to a bolometer pixel according to a non-limiting embodiment.

Turning now to FIG. 6, and referencing FIGS. 3, 4 and 5, a method of detecting thermal energy delivered to a bolometer pixel included in a thermal imaging system is illustrated according to a non-limiting embodiment. The method begins at operation 600, and at operation 602 a pixel array is armed by delivering a DC trim current ($I_{trim}$) to a plurality of pixel groups 302, each pixel group 302 including a plurality of bolometer pixels 100a, 100b, 100c, 100d operating at an expected or nominal temperature. At operation 604, a pixel group 302 included in the pixel array is selected. The selected pixel group 302 is connected to an integration unit 311, while the remaining pixel groups in the pixel array are connected to respective trigger sense circuit 300. At operation 606, the integration unit 311 reads an image generated by the bolometer pixels 100a, 100b, 100c, 100d included in the selected pixel group 302. At operation 608, the next pixel group in the pixel array is sequentially selected for image integration, and the method returns to operation 604 to connect the next selected pixel group to the integration unit 311.

While the integration unit 311 reads the image generated by the bolometer pixels 100a, 100b, 100c, 100d included in the selected pixel group 302 at operation 606, the temperature of the bolometer pixels 100a, 100b, 100c, 100d included in the remaining pixel groups is monitored by a respective trigger sense circuit 300 at operation 610. The temperature is monitored by comparing a voltage that represents a thermal resistance change of one or more of the bolometer pixels 100a, 100b, 100c, 100d with a reference voltage. At operation 612, a determination is made as to whether any of the bolometer pixels included in the remaining pixel groups are overheated. When one or more overheated bolometer pixels are detected, an output trigger signal 326 is generated by the trigger sense circuit 300 for that pixel group at operation 616 indicating that corresponding pixel group contains an overheated bolometer pixel.

Whether or not overheated bolometer pixels are detected at operation 612, the next pixel group is selected at operation 614, and the method proceeds to operation 604 to connect the next selected pixel group to the integration unit to provide essentially continuous pixel monitoring.

Figure 7:
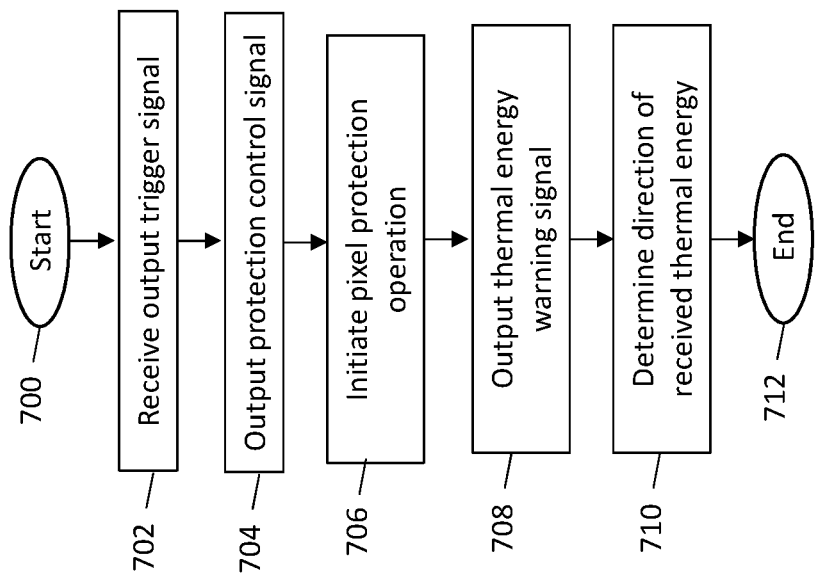
FIG. 7 is a flow diagram illustrating a method of protecting bolometer pixels in a thermal imaging system according to a non-limiting embodiment.

Turning now to FIG. 7, a method illustrates that a trigger detection signal output by the trigger sense circuit 300 and operation 616 can be utilized to perform a protection operation to protect overheated bolometer pixels in a thermal imaging system. The method begins at operation 700, and at operation 702 a determination is made as to whether a trigger sense circuit 300 outputs a trigger signal 326 indicating that a one or more bolometer pixels 100a, 100b, 100c, 100d is overheated. When the trigger signal 326 is not output from the trigger sense circuit 300, the method returns to operation 702 and continues monitoring for the trigger signal 326.

When, however, the trigger signal 326 is detected, a separate controller 328 outputs a protection control signal at operation 704, and a protection operation is initiated at operation 706 to protect the bolometer pixels 100a, 100b, 100c, 100d in the thermal imaging system. The protection operation can include, but is not limited to, initiating a mechanical shutter or a variable transmission window in front of the bolometer array to block the excessive energy delivered to the over-heated bolometer pixel(s). At operation 708, a protection control signal can be output (e.g., via an imaging system controller), and the direction(s) and/or location(s) of the thermal energy source(s) can be determined (via the imaging system controller) at operation 710 before the method ends at operation 712.

In one or more embodiments, a ROIC is provided that performs a pulsed-bias measurement of a bolometer pixel array. The bolometer pixel array contains a multitude of bolometer pixels arranged in selectable rows. The ROIC utilizes unbiased detectors as resistance reference source, which in turn can be used as high-energy thermal detectors. The ROIC includes a trigger sense circuit capable of providing an instantaneous value of a parallel combination of a group of resistors. When this value crosses a threshold, a comparator in the trigger sense circuit is tripped and outputs a trigger signal to the controller which determines that one or more bolometer pixels are overheated. In response to detecting one or more overheated pixels, the controller can output a protection control signal that invokes a thermal protection operation and/or initiates a thermal mitigation device such as, for example, a shutter or voltage-controlled window, that blocks the thermal energy source from delivered damaging radiation to the affected pixels.

The description of the present invention has been presented for the purpose of illustration. This description is not intended to be exhaustive or to limit the invention to the forms disclosed. Many modifications and variations will be apparent to those of ordinary skill in the art without departing from the scope and spirit of the invention. The embodiments of the invention discussed herein were chosen and described in order to best explain the principles of the invention and the practical applications, and to enable others of ordinary skill in the art to understand the invention. While certain embodiments of the invention have been described, it will be understood that those skilled in the art, both now and in the future, may make various improvements and enhancements that fall within the scope of the claims that follow.

What is claimed is:
1. A thermal imaging system comprising:
 a pixel array including a plurality of pixel groups, each pixel group comprising:
  a plurality of pixel rows, each pixel row containing a plurality of bolometer pixels;
  a trigger sense circuit including a pixel group input line in signal communication with the plurality of bolometer pixels; and
  a selector switch that selectively establishes an electrical connection between the pixel group and the trigger sense circuit; and an integration unit configured to generate an image based on a resistance of the plurality of bolometer pixels, wherein the selector switch operates in a first state to disconnect the pixel group from the pixel group input line while connecting the pixel group to the integration unit such that the integration unit generates the image, and wherein the selector switch operates in a second state to disconnect the pixel group from the integration unit while connecting the pixel group to the pixel group input line such that the trigger sense circuit monitors the pixel group for a high temperature bolometer.

2. The thermal imaging system of claim 1, wherein the trigger sense circuit further comprising:

a current source configured to generate a trim current; and an overheating condition detector circuit in signal communication with the plurality of bolometer pixels, the overheating condition detector circuit configured to detect at least one overheated bolometer pixel included in the pixel group in response to a level of the current.

3. The thermal imaging system of claim 2, wherein the trigger sense circuit outputs a trigger detection signal that initiates a pixel protection operation in response to detecting the at least one overheated bolometer pixel.

4. The thermal imaging system of claim 3, wherein the pixel protection operation reduces the temperature of the at least one overheated bolometer pixel.

5. The thermal imaging system of claim 4, wherein each bolometer pixel is configured to change resistance in response to a change in temperature such that current flow therethrough varies in response to a change in the resistance.

6. The thermal imaging system of claim 5, wherein the resistance decreases such that the current flow through the at least one overheated bolometer pixel increases.

7. The thermal imaging system of claim 6, wherein the overheating condition detector circuit further comprises:

a resistance transimpedance amplifier (RTIA) circuit configured to generate an output signal having a voltage indicative of the level of the current; and a comparator configured to receive a reference voltage and the output signal generated by the RTIA, and configured to detect the at least one overheated bolometer pixel based on a comparison between the voltage of the output signal and the reference voltage.

8. A trigger sense circuit comprising:

a current source configured to generate a trim current;

a pixel group input line in signal communication with a pixel group included in a pixel array, the pixel group including a plurality of pixel rows, each pixel row containing a plurality of bolometer pixels;

an overheating condition detector circuit in signal communication with the pixel group input line; and a selector switch that operates in a first state to connect the pixel group to the pixel group input line to establish a signal path between the pixel group and the overheating condition detector circuit, and a second state to disconnect the pixel group from the pixel group input line to open the signal path between the pixel group and the overheating condition detector circuit.

9. The trigger sense circuit of claim 8, wherein the overheating condition detector circuit is configured to detect at least one overheated bolometer pixel among the plurality of bolometer pixels in response a level of the current.

10. The trigger sense circuit of claim 9, wherein the overheating condition detector circuit outputs a trigger detection signal that initiates a protection operation to protect the at least one overheated bolometer pixel.

11. The trigger sense circuit of claim 10, further comprising:

a resistance transimpedance amplifier (RTIA) circuit configured to generate an output signal having a voltage indicative of the level of the current; and a comparator configured to receive a reference voltage and the output signal generated by the RTIA, and configured to detect the at least one overheated bolometer trigger pixel based on a comparison between the voltage of the output signal and the reference voltage.

12. A method of detecting at least one overheated bolometer pixel among a plurality of bolometer pixels, the method comprising:

arranging a plurality of pixel groups in a pixel array, each pixel group comprising a plurality of pixel rows, each pixel row containing a plurality of bolometer pixels;

connecting each pixel group to a pixel group input line, and connecting the pixel group input line to a trigger sense circuit;

operating a group selector switch in a first state that disconnects a selected pixel group among the plurality of pixel groups from the pixel group input line and connects the selected pixel group to an integration unit while remaining groups are connected to the pixel group input line, and a second state that disconnects the pixel group from the integration unit and connects the selected pixel group to the pixel group input line such that the selected pixel group is in signal communication with the trigger sense circuit;

generating an image based on a resistance of the plurality of bolometers connected to the integration unit; and monitoring a temperature of the remaining pixel groups via the trigger sense circuit.

13. The method of claim 12, where generating the image includes sequentially connecting and disconnecting the pixel groups to and from the integration unit over an image integration time period.

14. The method of claim 13, wherein monitoring the temperature of the selected pixel group comprises:

generating a current via a trim current source; and detecting, via an overheating condition detector circuit in signal communication with the plurality of bolometer pixels, at least one overheated bolometer pixel included in the pixel group in response a level of the current.

15. The method of claim 14, further comprising outputting, via the ROIC, a trigger detection signal that initiates a pixel protection operation in response to detecting the at least one overheated bolometer pixel.

16. The method of claim 15, wherein the pixel protection operation reduces the temperature of the at least one overheated bolometer pixel.

17. The method of claim 16, wherein detecting at least one overheated bolometer pixel comprises detecting that the current flow through the at least one overheated bolometer pixel has increased.

* * * * *